United States Patent
Hansen

(10) Patent No.: US 7,234,409 B2
(45) Date of Patent: Jun. 26, 2007

(54) VESSEL FOR TRANSPORTING WIND TURBINES, METHODS OF MOVING A WIND TURBINE, AND A WIND TURBINE FOR AN OFF-SHORE WIND FARM

(75) Inventor: Svend Erik Hansen, Brøndby Strand (DK)

(73) Assignee: Logima v/Svend Erik Hansen, Brondby Strand (DK)

( * ) Notice: Subject to any disclaimer, the term of this patent is extended or adjusted under 35 U.S.C. 154(b) by 0 days.

(21) Appl. No.: 10/815,684

(22) Filed: Apr. 2, 2004

(65) Prior Publication Data

US 2004/0262926 A1 Dec. 30, 2004

Related U.S. Application Data

(60) Provisional application No. 60/468,996, filed on May 9, 2003.

(30) Foreign Application Priority Data

Apr. 4, 2003 (DK) ............................... 2003 00515

(51) Int. Cl.
*B63B 27/00* (2006.01)
*B63B 35/00* (2006.01)
*B63B 35/44* (2006.01)
*E02B 17/00* (2006.01)
*F03D 1/00* (2006.01)

(52) U.S. Cl. ................... 114/258; 114/268; 405/195.1; 405/203; 290/55

(58) Field of Classification Search ................ 114/268, 114/258–260; 405/195.1, 201–209, 224; 212/307–311; 414/137.1, 140.3, 141.7, 142.8, 414/143.2, 137.7; 290/44, 45, 55
See application file for complete search history.

(56) References Cited

U.S. PATENT DOCUMENTS

| 393,790 | A | 12/1888 | Smith |
| 3,913,512 | A | 10/1975 | Kirby et al. |
| 4,345,536 | A | 8/1982 | Gregg |
| 7,112,010 | B1 * | 9/2006 | Geiger ............... 405/195.1 |
| 2003/0192465 | A1 | 10/2003 | Roodenburg |
| 2004/0169376 | A1 * | 9/2004 | Ruer et al. ............... 290/55 |
| 2005/0286979 | A1 * | 12/2005 | Watchorn ............... 405/224 |

(Continued)

FOREIGN PATENT DOCUMENTS

| DE | 10223314 A1 | 12/2003 |
| EP | 0353829 A1 | 2/1990 |
| EP | 353829 A1 * | 2/1990 |
| EP | 1 101 935 A2 | 5/2001 |
| EP | 1288122 A2 | 7/2002 |

(Continued)

OTHER PUBLICATIONS

"The TW 2.0 Offshore Technical Description", Engineering Document (Version 1B), May 15, 1999, pp. 1-36, Tacke Windenergie GmbH, Enron Wind GmbH, Salzbergen, Germany, XP001059295.
Andreas Wagner and Martin Kühn, "Offshore Wind: Utgrunden Leads the Way", Modern Power Systems, Oct. 2001, pp. 37-39, Enron Wind GmbH, Salzbergen, Germany, XP008000422.

*Primary Examiner*—Ajay Vasudeva
(74) *Attorney, Agent, or Firm*—Sughrue Mion, PLLC

(57) ABSTRACT

A wind turbine (1) has a base (5) divided into at least three ballast tanks (12). A vessel (7) has means for displacing the wind turbine between a loading space (25) and an unloading position (26). At its unloading position the vessel has winches (11) with at least three flexible lines (10) that can be connected with horizontally distanced lifting points (23) on the wind turbine base.

27 Claims, 10 Drawing Sheets

FOREIGN PATENT DOCUMENTS

| | | |
|---|---|---|
| EP | 1 234 978 A2 | 8/2002 |
| GB | 2 225 365 A | 11/1988 |
| GB | 2378679 A | 2/2003 |
| NL | 08500920 A | 10/1986 |
| WO | WO 99/43956 A1 | 9/1999 |
| WO | WO 01/34977 A1 | 5/2001 |
| WO | WO 0171105 A1 | 9/2001 |
| WO | WO 01/73292 A1 | 10/2001 |
| WO | WO 02/48547 A1 | 6/2002 |
| WO | WO 02/073032 A1 | 9/2002 |
| WO | WO 02/088475 A1 | 11/2002 |
| WO | WO 03/004869 A1 | 1/2003 |
| WO | WO 03/004870 A1 | 1/2003 |
| WO | WO 03004870 A1 | 1/2003 |
| WO | WO 03/062042 A1 | 7/2003 |
| WO | WO 03/066426 A1 | 8/2003 |

* cited by examiner

VESSEL FOR TRANSPORTING WIND TURBINES, METHODS OF MOVING A WIND TURBINE, AND A WIND TURBINE FOR AN OFF-SHORE WIND FARM

CROSS-REFERENCE TO RELATED APPLICATIONS

The present application claims the benefits of priority from Danish Patent Application No. PA 2003 00515 filed on Apr. 4, 2003 and from the U.S. provisional application No. 60/468,996 filed on May 9, 2003.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

In a first aspect, the present invention relates to a vessel for transporting a wind turbine, and in a second and a third aspect a method of moving a wind turbine, the method of the second aspect relating to moving the turbine from land to an offshore wind farm at its erection, and the method of the third aspect relating to removing a worn-out wind turbine from the offshore wind farm. In a fourth aspect the invention relates to a wind turbine.

The vessel according to the first aspect of the invention can load at least one wind turbine mounted on a base, the wind turbine, after the loading, being placed on the vessel on a loading space in an upright position corresponding to the upright operating position of the wind turbine.

Such a vessel is known from EP 1 101 935 A2, according to which the base, tower, nacelle and rotor blades are assembled on shore into an entire wind turbine to avoid the substantially higher costs involved in assembling the main components of the wind turbine at the offshore wind farm. Since a wind turbine for offshore use has a very considerable size, such as a height of more than 100 m and a mass of e.g. 1000 t in its assembled state, it is obviously no simple task to sail an entire wind turbine out to an offshore position and place it on the seabed. In the said publication, a crane on the vessel is used to lift the entire wind turbine from land onto the vessel, which then sails with this one turbine to the offshore position and lifts the turbine into place on the seabed. A vessel with a crane for lifts of about 1000 t is expensive to operate. One drawback is that this vessel is used to sail each individual wind turbine from land to the offshore farm, particularly if the farm is far from land.

WO 99/43956 describes how to build two wind turbines on a barge and tow them out to an offshore wind farm. On the farm, each turbine is lifted off the barge by means of a crane on another vessel and lowered into place on the farm. Experience shows that it is risky to lift a large structure from a floating vessel by means of a crane on another floating vessel, and it requires really calm weather and small wave heights to carry out a safe lift without damage to the structure. This means that only a limited number of days are available to erect a wind farm. Since crew and vessels are only available in coherent periods, this results in high costs for installing the farm.

Lifting the assembled turbine with base also implies the drawback that the turbine tower must be dimensioned in terms of strength to withstand the lift. Since the loads of a lift act differently from the dynamic loads in operation, the turbine tower has to be of sturdier dimensions to withstand the lift than would otherwise have been required. The heavier dimensions entail more weight and thus larger dynamic loads in operation and higher costs for manufacturing the wind turbine.

WO 02/088475 describes how one or two wind turbines with a base designed as so-called suction piles with an open bottom for being pressed down into the seabed material to create anchoring is/are suspended by wires in a vessel and sailed out to an offshore wind farm where the wind turbine is lowered into place on the seabed. Before sailing, the wind turbine is pulled up against the bottom or side of the vessel. However, the wind turbine is still a self-floating structure with an extremely elevated centre of gravity in relation to the centre of gravity of the vessel. This inevitably causes mutual movement of the structures during sailing, and it is only possible to sail out to the farm when the weather is good and the wave heights small, which limits the number of days available, as mentioned above, and entails high costs.

WO 01/34977 describes a wind turbine which is lifted into the water by a crane, whereupon a vessel grips around the tower, and ballast is removed from the base, which contains a single chamber communicating with the inside of the tower. When sufficient ballast has been removed, the wind turbine floats up to abut the vessel, which can then sail the wind turbine out to a farm where the base is filled with ballast so that the wind turbine sinks to the seabed. Quite apart from the problems of the crane lift of the turbine and sailing with two floating structures abutting each other, the grip around the turbine tower involves a risk of damage to the tower caused by the grip. Even minor scratches are of importance to the durability and strength of the turbine tower.

BRIEF SUMMARY OF THE INVENTION

In its first aspect, the object of the present invention is to provide a vessel allowing sailing with wind turbines at little risk of damage to the wind turbine and with safe delivery of the wind turbine on the farm.

In view of this, the invention related to the vessel is characterized in that the vessel has means for displacing the wind turbine from the loading space to an unloading position, and that the vessel has winches with at least three flexible lines with associated fastening means for mounting on at least three lifting points on the wind turbine base, the flexible lines being arranged at the unloading position so that their sections extending down to mounting places on the wind turbine base are spaced apart in the horizontal direction.

Since the wind turbine with base stands on the loading space on the ship during sailing, the ship is supporting the wind turbine in terms of buoyancy. This prevents the problems of sailing with two self-floating structures in mutual contact. Any influences between the lashing and stowing means on the vessel and the wind turbine may act on the wind turbine base, which is far more robust than the wind turbine tower. The wind turbine tower is mounted on the base and needs no further support during sailing. The sailing can thus be carried out at no risk of damage to the turbine tower.

In connection with unloading of a wind turbine, it is moved to the unloading position. This is effected by the vessel's means of displacing the wind turbine. By displacing the wind turbine, any grip around and lift in the tower or nacelle are avoided, thus eliminating the risk of damage to the tower. The displacement shifts the horizontal position of the centre of gravity of the wind turbine in relation to the centre of gravity of the vessel. During sailing, the distance between the wind turbine centre of gravity and the vessel centre of gravity is smaller than when the wind turbine has been displaced to the unloading position. The displacement thus makes it possible to design the vessel both with good sea properties during sailing and with good loading and unloading properties for wind turbines at sea at the farm.

When the wind turbine is placed in the unloading position and the at least three flexible lines are mounted on the associated lifting points on the wind turbine base, lowering of the wind turbine can start. Because the flexible lines extend downwards at a mutual horizontal distance, they will influence the wind turbine with upward, horizontally separated lifting forces. The lifting forces pairwise influence the wind turbine base with righting moments that compensate for the loss of righting moment which occurs when the waterline area of the wind turbine is reduced as most of the upper surface of the base is brought below the sea surface. It is thus possible to move the wind turbine from a stable condition on the vessel to a stable location on the seabed without any risk of capsizing.

Both sailing with the wind turbine and its transfer to a location on the seabed can be effected by means of equipment on the vessel itself and solely by influencing the wind turbine base. If the vessel is a barge the equipment on the barge need not be able to propel the barge, because the barge is towed or pushed by a tugboat during the transfer from the port to the offshore wind field. Because only the wind turbine base is influenced, both sailing and unloading can be done under rather poor weather conditions and at no risk of damaging the tower. When erecting a large farm, the vessel according to the invention thus has more effective workdays than prior-art vessels.

At the unloading position, the vessel preferably has two projecting arms arranged at a mutual horizontal distance larger than the width of the wind turbine base, and at least two of the flexible lines extend from the arms to the lifting points on the wind turbine base. In the unloading position, the wind turbine base may be placed between the arms, which are suited to act as guides for the base, preventing the wind turbine from turning about the longitudinal axis of the turbine tower. Control of the angular position is of importance in the cases where the wind turbine connection to a power system on the seabed is mounted on one side of the wind turbine base. Moreover, the two projecting arms provide distance to the remaining part of the vessel hull so that the vessel only has to sail a short distance to be brought completely free of the wind turbine. This is of importance to the unloading, as the wind turbine becomes stationary at the moment when the base is placed on the seabed, whereupon vessel movements in the sea cause the vessel to move in relation to the wind turbine. The possibility of rapidly bringing the vessel away from the wind turbine permits unloading of wind turbines in more rough weather.

It is possible to have only one flexible line extending from each of the arms and then have, for example, one or two flexible lines extending from the vessel deck near the projecting arms. It is preferred, however, that each arm is associated with at least two flexible lines so that one arm lifts in lifting points on one side of the wind turbine base, and the other arm lifts in lifting points on the opposite side of the wind turbine base. If the two flexible lines of the arm extend from the arm down to the lifting points on the wind turbine base with a distance in the longitudinal direction of the arm substantially corresponding to the length of the wind turbine base, a substantially vertical pull in the four lifting points is obtained. The flexible lines can also be arranged at a larger mutual horizontal distance, which makes the lifting forces form a small angle to vertical in a direction away from the wind turbine, whereby, in addition to the vertically acting lifting forces, the wind turbine is also, via the lines, influenced by horizontal forces having a centring effect on the horizontal position of the wind turbine in relation to the four lifting points.

It is possible that the means for displacing the wind turbine include rails extending along the full length of the loading space of the vessel to the unloading position. The wind turbines may, for example, be displaced on the rails by means of hydraulic jacks, which can be actuated, after fastening, to push the wind turbine base a distance towards the unloading position, whereupon the jacks are moved a corresponding distance forwards, fastened and actuated for another push, and so forth until the wind turbine has been displaced all the way to the unloading position. The wind turbine can also be pulled along the rails by means of winches. The rails may, for example, be used for displacement of wind turbines which are not self-floating, such as a wind turbine with too small volume in its base for it to be self-floating. In that case the vessel is designed with supports to carry the wind turbine in the unloading position until suitable lifting forces have been established with the flexible lines, whereupon the wind turbine can be released from the supports and lowered on to the seabed.

In one embodiment of the vessel, at least one of the winches with flexible lines used at the unloading position is part of the means for displacement of the wind turbine from the loading space to the unloading position. The equipment of the vessel is in this case simplified in that one and the same winch is used for both the displacement and the lowering of the wind turbine. A further advantage obtained is that the flexible line is connected with the lifting point on the wind turbine base before it has been displaced to the unloading position.

In an embodiment of the vessel which is particularly advantageous for transporting wind turbines able to float themselves, the vessel, in a condition of heavy draught, has the deck of the loading space located at such depth below the water surface that a wind turbine can float over the loading space, and in a transport condition with lighter draught the deck of the loading space is located above the water surface so that the wind turbine is carried by the vessel. When a wind turbine is to be displaced from the loading space to the unloading position, the wind turbine is first brought into a self-floating condition where the vessel is ballasted for heavy draught and the wind turbine base has sufficient positive buoyancy to keep the entire wind turbine in a floating upright condition. Then the wind turbine is pulled to the unloading position, and the vessel may possibly be relieved of ballast before the wind turbine is lowered on to the seabed. The change of ballasting of the vessel can be made quicker and using less crew than the above jack-driven displacement of the turbine on rails.

For use in connection with transporting wind turbines having ballast tanks, the vessel may have ballast means for changing the ballast condition of a wind turbine base. By placing the ballast means on the vessel, they become more reliable in operation, and they can be reused from turbine to turbine. The manufacturing costs for the individual turbine thus become lower.

As mentioned above, a second aspect of the invention relates to a method of moving a wind turbine built on a wind turbine base with a tower, nacelle and rotor blades before the wind turbine is sailed out to an offshore wind farm, at least one wind turbine being placed on a vessel in an upright position corresponding to the upright operating position of the wind turbine and sailed to a place of installation on the offshore wind farm, whereupon the wind turbine is transferred from the vessel to its place of installation on the seabed.

In a method known from EP 1 101 935 A2, the wind turbine with base is lifted over onto and away from a crane barge, and as mentioned above this influences the tower with the lifting forces. In WO 99/43956 wind turbines are lifted by means of another floating vessel, in WO 02/088475 a wind turbine is floated out in contact with a vessel, and in WO 01/34977 the tower of a wind turbine is held by a gripper while the ballast quantity in the wind turbine base is changed.

In its second aspect, the object of the present invention is to provide a method allowing in a simple way largely damage-free handling and safe sailing with wind turbines to a farm and placing of the wind turbines on it.

In view of this the method is characterized in that the wind turbine on the vessel is supplied with ballast in the wind turbine base before being sailed out to the wind farm, and that, in connection with transfer of the wind turbine from the vessel to the place of installation, ballast is supplied to the wind turbine base while the wind turbine base is held suspended in at least three horizontally distanced flexible lines from the vessel with at least most of the upper surface of the wind turbine base located above the sea surface.

By supplying ballast to the wind turbine before it is sailed out to the farm, it will stand on the vessel deck with a suitable stability for the wind turbine to withstand the movements of the vessel at sea, and it remains standing securely on the vessel during displacement and lowering of one of the other wind turbines. When the vessel is at the farm and the wind turbine is to be transferred to the seabed, the wind turbine base is suspended in the at least three flexible lines, and then the ballast is supplied and the wind turbine is lowered on to the seabed. As described above, the stability of the wind turbine against capsizing is maintained by the horizontally distanced lines during the entire lowering, and also while the upper surface of the lower section of the base passes down below the sea surface.

The wind turbine is preferably self-floating and is moved in a floating, upright position to a position above a loading space on the vessel before the ballast is supplied in connection with placing on the vessel. When the ballast is supplied, the wind turbine sinks down to be placed on the loading space. Alternatively the draught of the vessel can be diminished until the wind turbine is placed on the vessel and then ballast can be supplied to the ballast tanks in the wind turbine base.

After being sailed out to the offshore wind farm, the wind turbine can advantageously be brought into a floating, upright position before it is lowered to its place of installation. The design of the vessel is simpler when the wind turbine can be brought into a self-floating position before lowering.

The method according to the invention provides an advantageous possibility of loading the vessel with at least three, preferably four or five ready-assembled and function-tested wind turbines. Because of the extremely low risk of damage to the wind turbines during transport and transfer to the seabed, their assembly can be finished before they are loaded onto the vessel. The wind turbines can thus be finished in a factory on land or by the port and be function-tested at the factory or at the port so that any defects of the wind turbine have been rectified before the final sailing out to the offshore wind farm. When the wind turbine is placed on the seabed, it only has to be connected to the power grid to be operational. By loading three or more wind turbines on the vessel, the farm can be erected more quickly by means of a single vessel.

In its third aspect, the present invention relates to a method of moving a wind turbine from a place of installation on the seabed on an offshore wind farm by means of a vessel. The known wind farms have all been erected without taking into consideration that at some time the wind turbines are worn out and must be removed.

With a view to removing a wind turbine when it is no longer to be in operation on the farm, the method according to the invention is characterized in that the wind turbine base is connected to at least three horizontally distanced flexible lines from the vessel, that ballast means on the vessel are connected to the wind turbine base, that lifting by the flexible lines is performed while the wind turbine is standing on the seabed, and that ballast is removed from the wind turbine base, the lift in the flexible lines being maintained until at least most of the upper surface of the wind turbine base is located above the sea surface. In this way it is possible in a simple manner to remove the wind turbine from the farm.

In its fourth aspect, the present invention relates to a wind turbine with a wind turbine base, the wind turbine base being designed as a buoyant body able in its floating condition to support a tower with nacelle and turbine blades mounted thereon, and being adapted for reception of ballast liquid. Such a wind turbine is described in WO 01/34977.

In order to provide a wind turbine which can be sailed out to an offshore location and lowered on to the seabed without any actual risk of damage to the turbine tower, the wind turbine according to the invention is characterized in that the wind turbine base is divided into at least three chambers, and preferably at least four chambers, at least three of which act as ballast tanks, and that the wind turbine base has at least three lifting points with fittings for mounting fastening means.

The effect of the division of the base into chambers is that, in a self-floating condition with most of the upper surface of the base above the sea surface, the wind turbine is stable in its floating position without support from other structures. The at least three lifting points allow connection of lines from a vessel so that the stability can be maintained when the upper surface of the lower section of the base with large width is brought down below the sea surface.

In a preferred embodiment the base has a square shape at its lower part and a lifting fitting at each corner. The square shape is easy to stow on the loading space of the vessel and is suited to provide effective support on the seabed. The regular square shape is also production-friendly and allows symmetrical construction of the base.

In one embodiment, each ballast tank of the base has a filling pipe, an emptying pipe and preferably also a sounding pipe, the emptying pipe and the sounding pipe extending down near the bottom of the ballast tank. With ballast tanks equipped in this way, the ballast quantity can be controlled from a vessel by connecting hoses to the pipes and supplying or removing ballast using pumps on the vessel. The ballast tanks can thus be made without movable members for changing the ballast quantity. This design provides extremely high reliability also after the wind turbine has been in operation on an offshore farm for a number of years.

The filling pipe, emptying pipe and sounding pipe of the ballast tank may be three pipes each communicating with all the ballast tanks in the base, which provides simultaneous filling or emptying of all the tanks of the wind turbine. Preferably, however, each ballast tank has three separate pipes so that accurate adjustment of the weight distribution of the base can be carried out during lowering.

In one embodiment, the emptying pipe is provided with an ejector for suction of fluid from the ballast tank when the ejector is supplied with pressurized liquid. The ejector provides high reliability of emptying of the ballast tank when the wind turbine stands on the seabed. As an alternative to the use of an ejector, the emptying pipe may have a pump connection near the ballast tank, which then requires mounting of a suction pump on the connection by a diver when the wind turbine is to be removed.

In a further aspect the present invention relates to a method of building an offshore wind power farm having an electric grid placed on the sea bottom and a plurality of wind turbines connected to the electric grid for delivering power thereto.

The building of offshore wind power farms has hitherto been based on the principle that all wind turbines in the farm had to be installed before the electric grid was installed. In order to build an offshore farm with 80 wind turbines is has been normal to use from 9 to 12 months. It is an object of the latter aspect of the invention to enable production of power at an earlier time than possible with the prior art methods. With the wind turbines according to the present invention the installation period can be reduced to about 4 to 6 months because the turbines are completely tested on shore before they are transferred to the farm. With a view to obtaining an even earlier start of production the present invention is characterized in that the lines in the electric grid are installed on the sea bottom before all wind turbines have been installed, and preferably prior to the placement of the first wind turbine on the farm, and that some of the wind turbines are placed on the farm and connected to the electric grid before all the wind turbines have been placed on the farm. Saving in time is obtained by connecting wind turbines to the grid at the same time as wind turbines continue to be placed in the farm.

In a further development of this embodiment a transformer station is connected to the electric grid before all wind turbines have been placed on the farm, and one or more of the wind turbines connected to the electric grid and begin to produce electricity before all wind turbines have been placed on the farm. This partial taking wind turbines into normal service operation creates value because the power production begins at an earlier time.

BRIEF DESCRIPTION OF THE SEVERAL VIEWS OF THE DRAWING

Examples of the invention will now be explained below with reference to the very schematical drawings, in which.

DETAILED DESCRIPTION OF THE INVENTION

Figure 1:
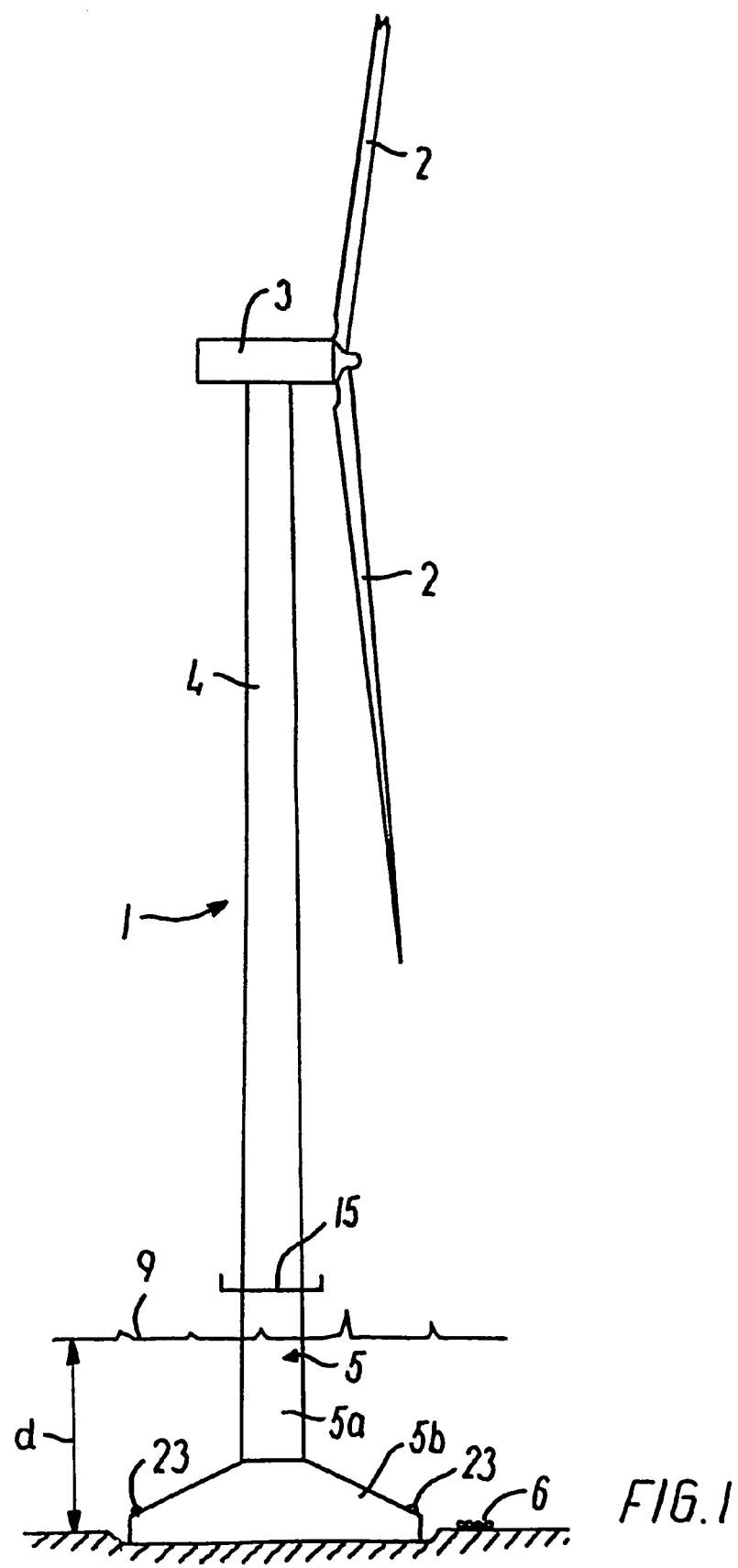
FIG. 1 depicts a side view of an offshore wind turbine according to the invention.

As shown in FIG. 1, a wind turbine 1 has a number of rotor blades 2, typically two or three, mounted on a nacelle 3 at the top of a tower 4 mounted on a wind turbine base 5. The wind turbine tower, nacelle and rotor blades may be of any suitable design and may, for example, be a 2 MW turbine of one of the makes of Vestas Wind Systems A/S, Bonus Energy A/S or NEG Micon A/S. Such a wind turbine typically has a height from the bottom of the base to the top of the nacelle of 90–100 m and a blade length of about 40 m.

Offshore wind turbines may have larger dimensions than as mentioned, such as outputs of 3 MW, 4 MW or 5 MW or more with heights of 100–140 m and rotor blade lengths of 45–80 m. Normally, wind turbines of dimensions below 1 MW are not usable.

The design of the actual tower with nacelle and rotor blades is extremely well-known. The rotor blades 2 are mounted on a rotor in a wind turbine, which, in the nacelle housing, is mounted on a base plate and is connected to a control and safety system controlling the setting of the rotor blades, among other things, and actuating braking systems when needed. The wind turbine has an electric system that generates power and possibly transforms voltage and/or frequency to suitable values. The electric system is passed down through the tower to the base, which has connecting parts intended for grid connection.

In an offshore wind farm it is common to lay out a grid 6 to which the wind turbines can be connected, and to prepare the seabed at the place of installation of each turbine before the wind turbines are installed on the farm. Of course, it is possible to lay out the grid after installing the turbines, but the preparation of the seabed for installation of the turbines suitably goes with laying out the grid.

The height of the wind turbine varies with the water depth d. As an example, a 2 MW wind turbine for installation at a water depth of 10 m may have a height of about 90 m to the top of the nacelle. In such case the base may have a height of about 20 m. If the water depth deviates from the 10 m, the adjustment to the relevant water depth for the same wind turbine output is preferably effected by varying the height of the base. In this manner, in a simple way for manufacturing purposes, the same turbine tower, nacelle and rotor blades may be used for different water depths, such as depths in the interval from 5 to 30 m, by varying the height of the base from 15 to 40 m. The height of the wind turbine tower depends on the rotor blade length, which again depends on the number of rotor blades on the turbine and on the output, the length increasing with increasing output and decreasing number of rotor blades, and vice versa.

A vessel 7 may be used to transport the wind turbines out to the offshore farm. For the sake of clarity, the vessel hull is illustrated with a hatched section in FIGS. 2 to 5 although naturally the hull is not solid.

It is extremely advantageous if the wind turbines can be built and made ready on shore to the greatest possible extent because production costs here are lower than offshore. In the optimum case, the wind turbines are finished, tested and rectified on shore before being sailed out to the offshore wind farm. One option is to sail them out directly from the manufacturing plant, which is typically built at a port. If the offshore farm is far from the manufacturing plant, it is also possible to carry out intermediate transportation, for example on a barge, from the place of production to an intermediate port where the vessel 7 picks up the ready-assembled wind turbines for sailing out to the farm. The wind turbines can alternatively be towed in self-floating condition from the place of production to the intermediate port. During such a towing action several wind turbines can be interconnected and towed together in order to increase the efficiency of the towboats.

The vessel may be designed in a way so that the wind turbine is pushed on board by means of jacks pressing on the base in a horizontal direction, and may have an associated rail system on which the wind turbine slides. In that case the rail system on shore has then been coupled to a rail system onboard the vessel during loading so that the wind turbine can be pushed all the way to its transportation space where the wind turbine will stand during sailing. Such a design of the vessel is particularly applicable for transportation of ready-assembled wind turbines that are not self-floating. In connection with unloading at the offshore wind farm, such wind turbines can be displaced along the rail system to the unloading position where, after connection to lifting wires, they are lowered on to the seabed substantially as described below.

In a preferred embodiment, the vessel 7 has a variable draught and a loading deck 8 located at such height in relation to the water surface 9 that the deck 8 firstly, in a transport position shown in FIG. 2 with light draught for the vessel, is located above the sea surface and secondly, in a loading position shown in FIG. 3 with heavy draught for the vessel, is located at such a lowered depth h below the water surface 9 that a wind turbine 1 in a self-floating condition has less draught than the lowered depth h of the loading deck. This enables the wind turbine 1 to be displaced horizontally in relation to the vessel 7 either by the vessel being sailed below or away from the wind turbine or by the wind turbine being towed horizontally in relation to the vessel.

Figure 3:
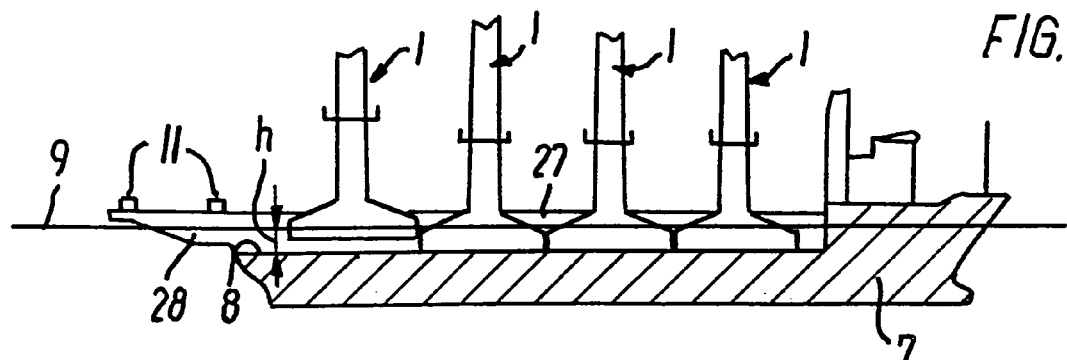

In connection with loading of the vessel with wind turbines at port, the vessel may be ballasted to the sunken-down position shown in FIG. 3, whereupon one or more wind turbines are brought into position above their intended loading spaces on the loading deck of the vessel. Then the base of each wind turbine is supplied with ballast until it has sunk down to stand on the loading deck of the vessel. The wind turbines may be towed individually over the vessel and lowered into place on the loading deck, or several wind turbines may be towed together and lowered.

Figure 2:
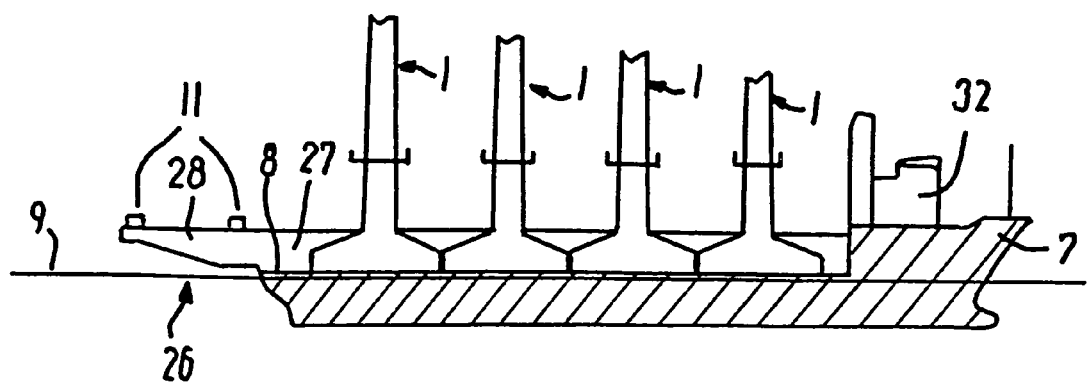
FIGS. 2 to 5 show a vessel according to the invention with wind turbines according to the invention illustrated in four different mutual positions.

When the vessel 7 has sailed the wind turbines 1 out to the offshore farm, the vessel can be lowered, by means of pumping ballast into the vessel, from the position shown in FIG. 2 to the position shown in FIG. 3, where the aftmost wind turbine is floating while the other wind turbines have such a ballast quantity in their bases that they keep standing on their loading spaces. The aftmost wind turbine is then displaced horizontally from the loading space to the unloading position shown in FIG. 4. This may be effected by persons on the vessel manually dragging the wind turbine aftwards by means of wires fastened to the wind turbine. Preferably, however, the wind turbine is displaced by means of one or more flexible lines 10 (FIG. 14) which are mounted on the vessel and which, after fastening to the wind turbine base, pull the wind turbine aftwards by means of associated winches 11.

In the context of the present invention the term line is to be understood as any kind of flexible means capable of transferring pull, such as wire, rope, cable, cord, wire rope, steel wire rope, manila rope, or artificial rope. And the term winch is also to be understood in a broad sense, such as winch, hoist, wire lifter unit, windlass or capstan.

Figure 4:
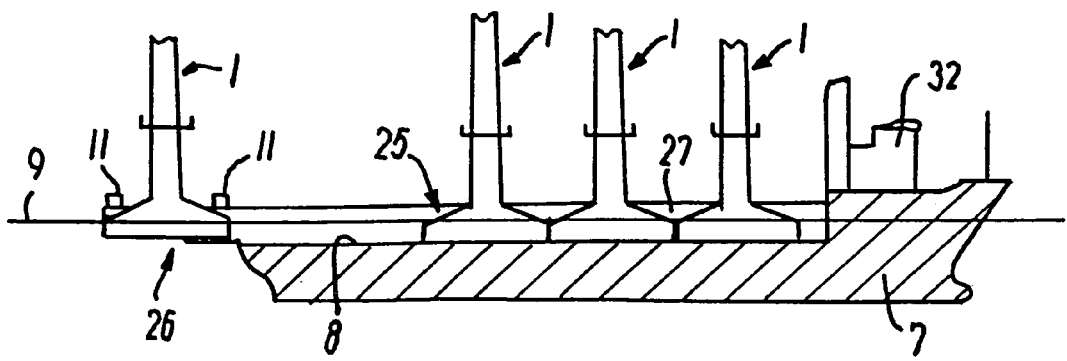
Figure 5:
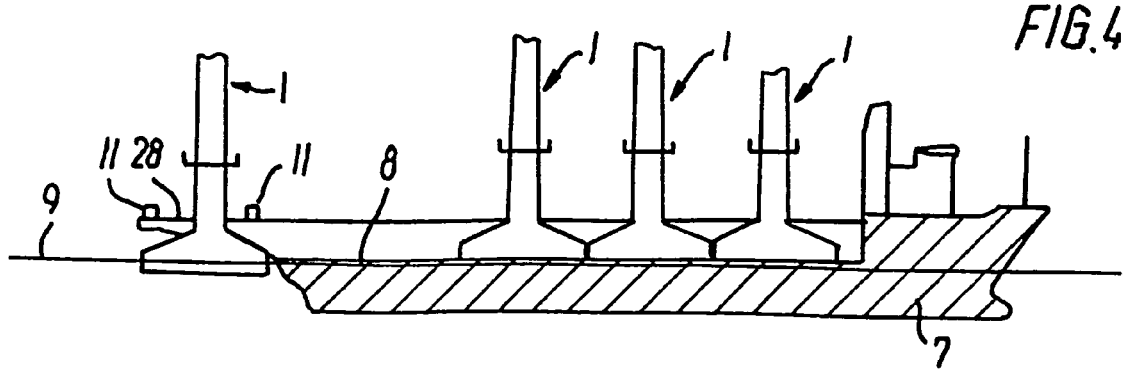
Figure 13:
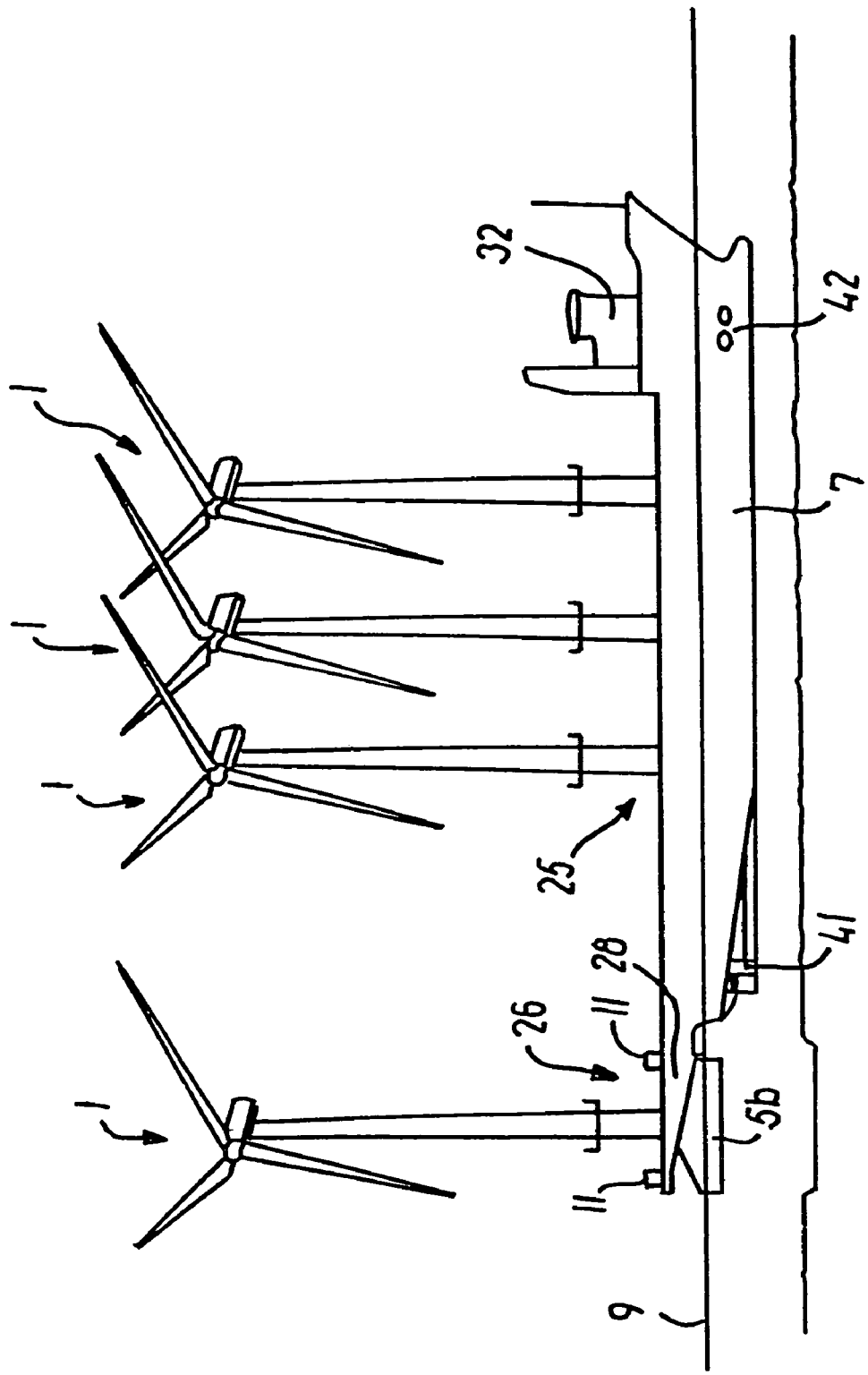
FIGS. 13 to 15 show side view outlines of the vessel and a wind turbine shown in three different positions at the unloading position of the vessel.

When the wind turbine has been displaced horizontally to the position shown in FIG. 4, the draught of the vessel may be reduced by pumping out ballast from the vessel until the position shown in FIG. 5, where-upon the wind turbine can be lowered into place on the seabed as described below in connection with FIGS. 13 to 15. The reduction of the vessel draught considerably increases the stability of the vessel as the entire loading deck is brought up above the sea surface. It is therefore preferred that the vessel is brought into the position shown in FIG. 5 before the lowering, but it is also possible to perform the lowering from the position of the vessel shown in FIG. 4, particularly in case of light sea and little wind.

Figure 6:
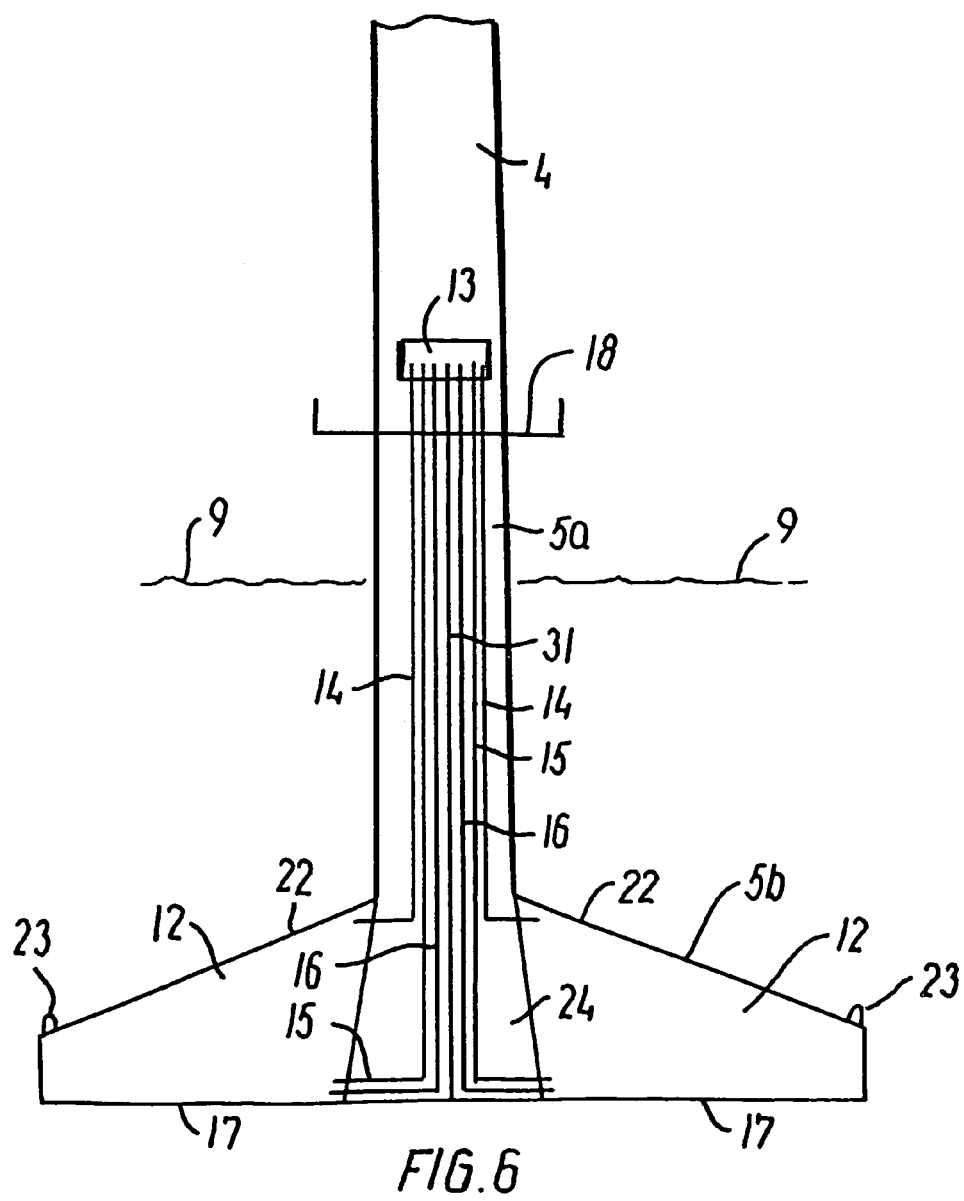
FIG. 6 illustrates a diagram of pipe connections to ballast tanks in the wind turbine of FIG. 1, FIGS. 7 to 10 illustrate four different embodiments of the wind turbine according to the invention.

In connection with handling of the wind turbine 1, the ballast quantity in the wind turbine base 5 must be changed. This is effected by removal or supply of ballast liquid from or to ballast tanks 12 in the wind turbine base. Naturally, it is possible to supply ballast to the tanks by means of operation of a valve in the side of the ballast tank, that is, by opening of such a valve, and to remove ballast by actuation of a pump mounted inside the ballast tank, but preferably there are no movable parts in the ballast tank that require maintenance. For wind turbines that have to stand for many years on a wind farm, it is an advantage that the wind turbine does not contain the active movable parts for changing the ballast content in the tanks. In a preferred embodiment of the wind turbine, it is therefore, as illustrated in FIG. 6, designed with permanent pipes leading from a connection place 13 above the sea surface down to the ballast tanks 12 in the base.

The connection place 13 may lie protected behind a cover panel in the upper part of the base, and the individual pipes may each terminate in a protective cover. After removal of the cover panel and covers, hoses may be connected to the pipes. Each ballast tank may be associated with a filling pipe 14, a sounding pipe 15 and an emptying pipe 16, at least the emptying pipe 16 and the sounding pipe 15 extending down near the bottom 17 of the ballast tank. The hoses can be connected by operating staff standing on a platform 18 at the transition between the base and the tower 4.

Figure 11:
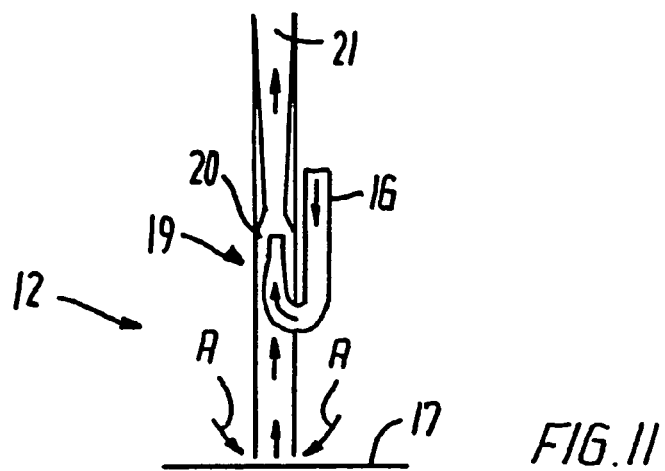
FIG. 11 is a longitudinal sectional view through an ejector in an emptying pipe in a ballast tank of the wind turbine.

The filling pipe 14 may end at a random place inside the ballast tank. The emptying pipe 16 should act at the bottom of the ballast tank so that most of the liquid contents of the ballast tank can be removed by means of the emptying pipe. In one embodiment the emptying pipe 16 may have a connection located less than 8 to 10 m above the bottom 17 and having a connection for a suction pump which can be mounted above the sea surface or by divers below the sea surface. In the preferred embodiment, however, the connection for the emptying pipe 16 is located at the connection place 13 for the other pipes, and in that case the emptying pipe is provided with an ejector 19 down in the ballast tank, see FIG. 11.

As illustrated by the arrows A, the ejector 19 sucks liquid out of the ballast tank 12 when the emptying pipe 16 is supplied with pressurized liquid by means of a pump that may be placed at great height above the ejector. The liquid supplied through the emptying pipe 16 is passed up through the ejector and produces a low pressure at nozzle 20 which sucks liquid from the ballast tank 12 up through the discharge pipe 21, which opens out outside the ballast tank 12, such as at the base above the sea surface 9. Instead of opening out above the sea surface, the discharge pipe 21 may open out below the sea surface, such as at the upper surface 22 of the ballast tank, but then a non-return valve has to be mounted in the discharge pipe to prevent return flow of liquid to the ballast tank.

Moreover, in the embodiment of FIG. 6, the base has a pipe 31 having a connection for a hose at its upper end. The pipe 31 leads to the bottom of the base and opens out at the lower surface of the base so that pressurized liquid can be passed through the pipe 31 down below the bottom of the base when the wind turbine is to be lifted off the bottom.

In the following description of different embodiments the same reference numerals as above will be used for the sake of simplicity for details having substantially the same function.

Wind turbine bases can according to the present invention have different designs. In an upper section 5a the base is tubular and ends upwards in a flange for assembly with a bottom flange on the tower 4. The section 5a may be cylindrical, but the section may also have a smaller diameter in the wave-affected area at the sea surface. A lower section 5b of the base has a substantially larger diameter than the upper section 5a. The lower section 5b acts as the gravitational base of the wind turbine. For the wind turbine of 2 MW mentioned above, the nacelle may, for example, have a mass of 106 t, the tower may have a mass of 160 t, the upper section 5a may have a mass of 40 t, and the lower section 5b may have a mass of 400 t when it is made of steel. If the lower section is of steel-reinforced concrete the mass of the lower section 5b is e.g. in the range of 1200 to 1600 t. The lower section 5b of the base can e.g. have a square bottom surface with a side length of 24 m and a vertical side height of about 4 m and an upper side extending from said vertical side obliquely upwards and inwards to the upper section 5a. For a wind turbine of 3 MW the rotor blades can e.g. have a length in the range from 42 to 46 m and a weight that is about 10% higher than the weight of the 2 MW wind turbine. The lower section 5b of the base can in this case e.g. have a square bottom surface with a side length of 25 m and a vertical side height of about 4.5 m. For a wind turbine of 5 MW the rotor blades can e.g. have a length in the range from 53 to 57 m and a weight that is about 50% higher than the weight of the 2 MW wind turbine. The lower section 5b of the base can in this case e.g. have a square bottom surface with a side length of 29 m and a vertical side height in the range of about 5 m to 6 m.

The upper section 5a may, for example, be a steel pipe, or it may be made of reinforced concrete. The lower section 5b is typically made of reinforced concrete and may be provided with steel girders, such as vertical steel panels, having weighing holes at their lower edges to permit liquid passage in the cases where a girder is placed inside a ballast tank. When the lower section is made of reinforced concrete, a steel panel extending over most of the lowermost area of the base may be integral with the bottom of the section. Alternatively, the lower section 5b may be constructed from steel.

After placing of the wind turbine on the farm, the base 5 preferably stands directly on the seabed and carries the wind turbine by virtue of its own weight, that is, without any foundation proper into the seabed. Although it is possible to anchor the base further into the seabed by means of one or more foundation piles, this is not preferred because it requires foundation work to be carried out and requires further work when the wind turbine is to be removed from the farm.

Figure 7:
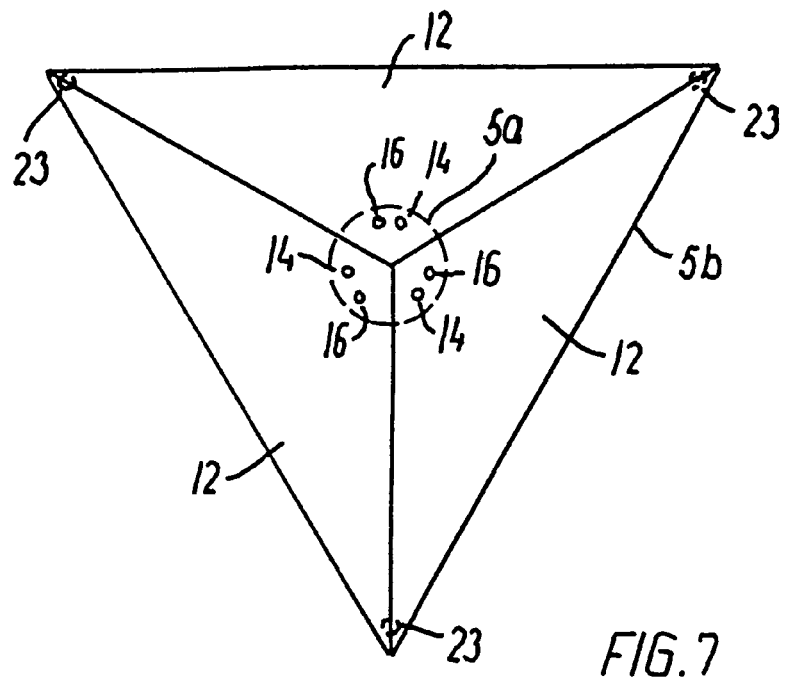

FIG. 7 shows an embodiment in which the lower section 5b of the base has three ballast tanks 12. In a top view, the base has a triangular shape, and each ballast tank is provided with a filling pipe 14 and an emptying pipe 16. It is possible, but not necessary to provide each ballast tank with a sounding pipe (not shown). Furthermore, near the tips of the triangle, the base is provided with three fittings 23 for mounting of fastening means for lifting of the base. The fittings may, for example, be designed as eye fittings that can be made to engage with shackles or similar fastening means on flexible lines.

Figure 8:
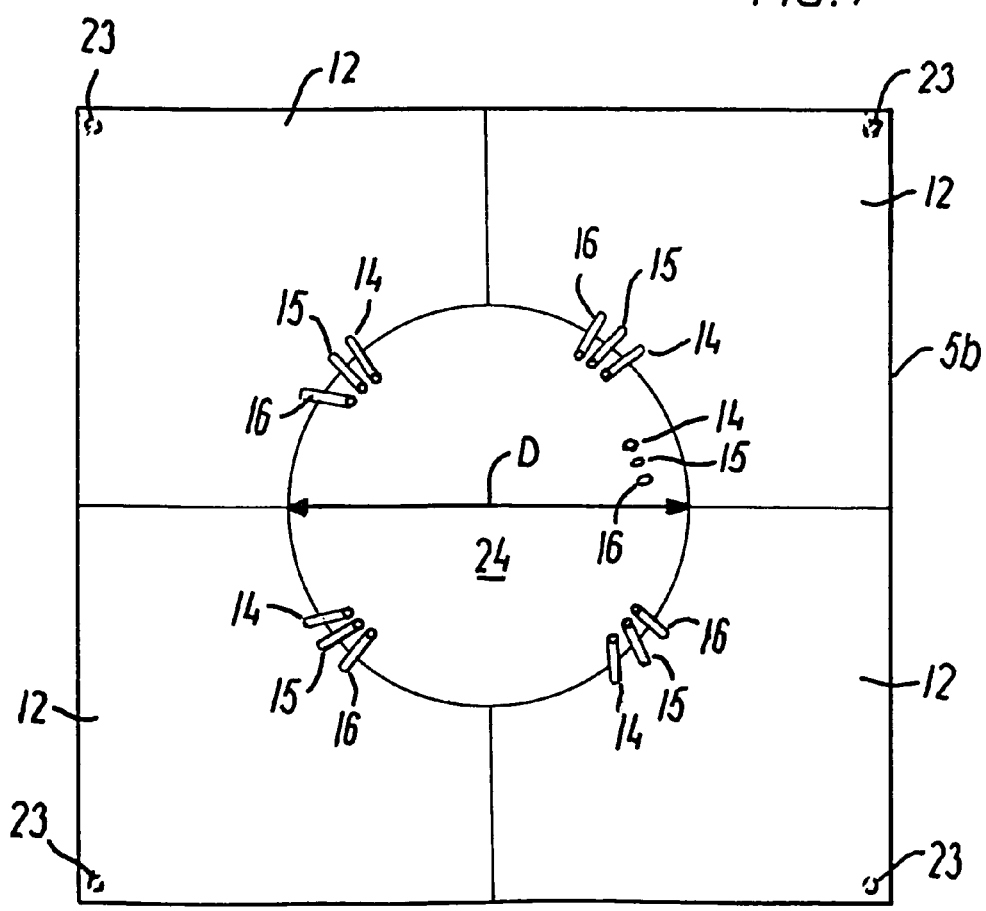

FIG. 8 shows another, preferred embodiment. The lower section 5b of the wind turbine base is divided into a circular central chamber 24 with a diameter D corresponding to about half the width of the base and into four surrounding ballast tanks 12. Each ballast tank has a filling pipe 14, a sounding pipe 15 and an emptying pipe 16. The central chamber 24 may also have a filling pipe 14, a sounding pipe 15 and an emptying pipe 16. This makes it possible to perform individual ballast adjustment of each ballast tank and possibly also of the central chamber. A fitting 23 is provided at each corner of the base. The wall of the central chamber may be conical so that at the top it tapers into the pipe of the upper section 5a.

Figure 9:
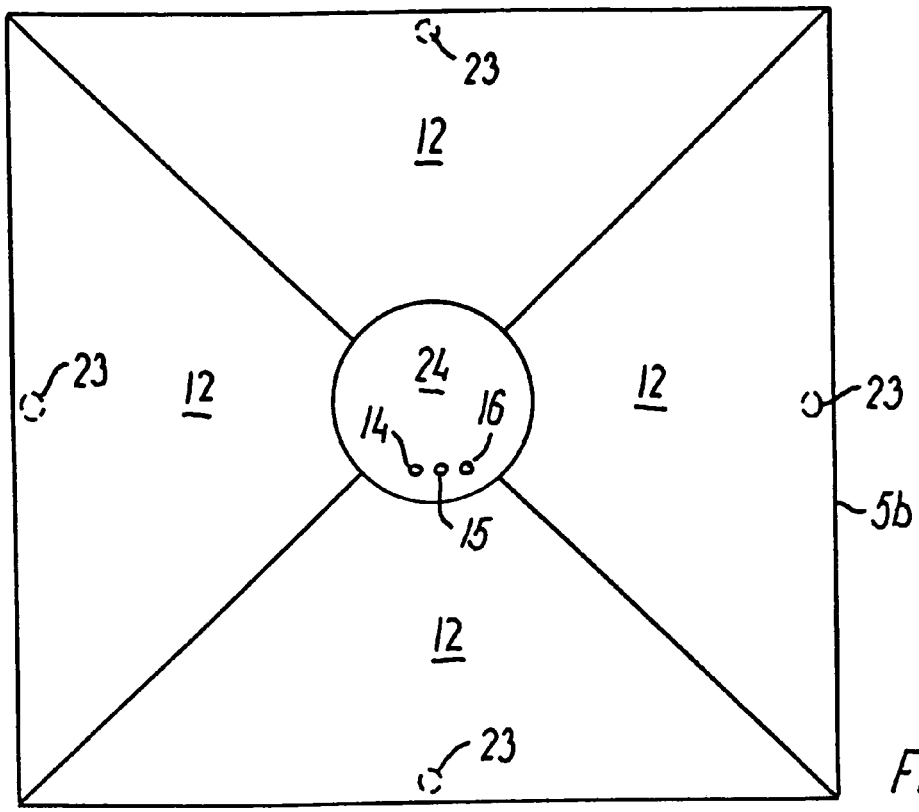

FIG. 9 shows a further embodiment in which a base has a similar main division into a central chamber 24 and four surrounding ballast tanks 12. In this embodiment there is only a single joint set of pipes, viz., a single filling pipe 14, a single sounding pipe 15 and a single emptying pipe 16. Thus simultaneous filling, emptying and sounding of all ballast tanks of the base are carried out. This has been facilitated by flow passages with a relatively small area in the partitions between the ballast tanks so that only slow fluid flows between the chambers are possible, but not stronger flows that might cause absence of the desired stability-improving effect of the division of the base into several chambers. The fittings 23 are not located at the corners of the base, but instead at the middle of the long sides of the base.

Figure 10:
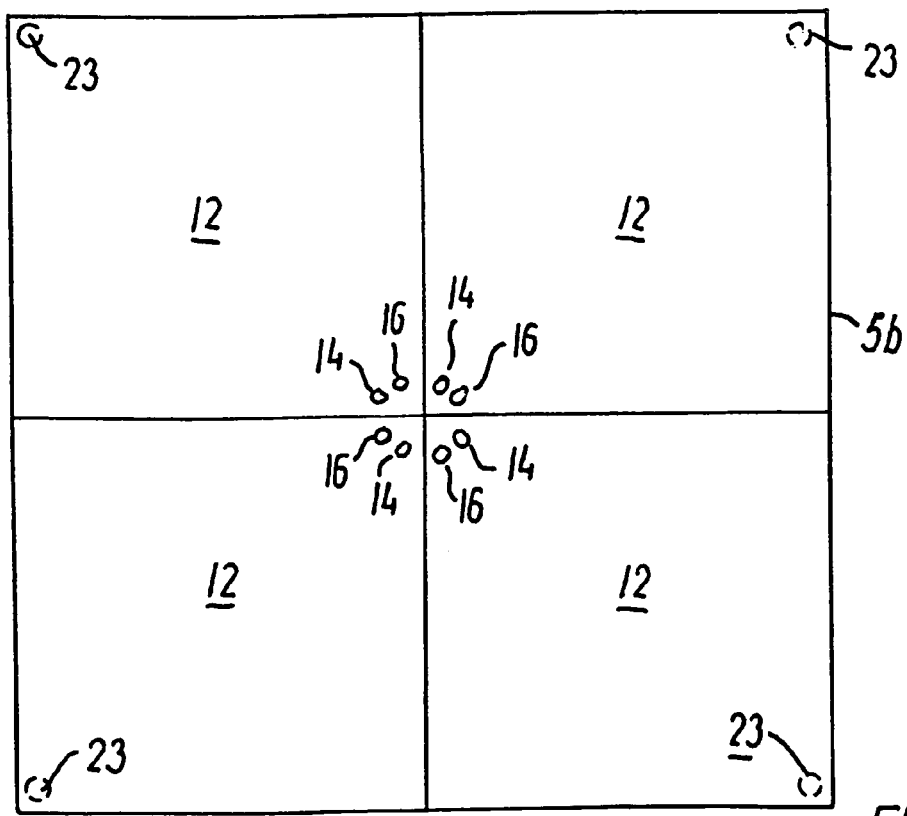

FIG. 10 shows a further embodiment of the wind turbine in which the base is divided into four ballast tanks 12, each provided with at least a filling pipe 14 and an emptying pipe 16. Concerning sounding, it is possible to use the emptying pipe as a sounding pipe during the periods when ballast is supplied or between the periods when no ballast is emptied out. However, this requires a switch on the emptying pipe between a sounding position and an emptying position.

Figure 12:
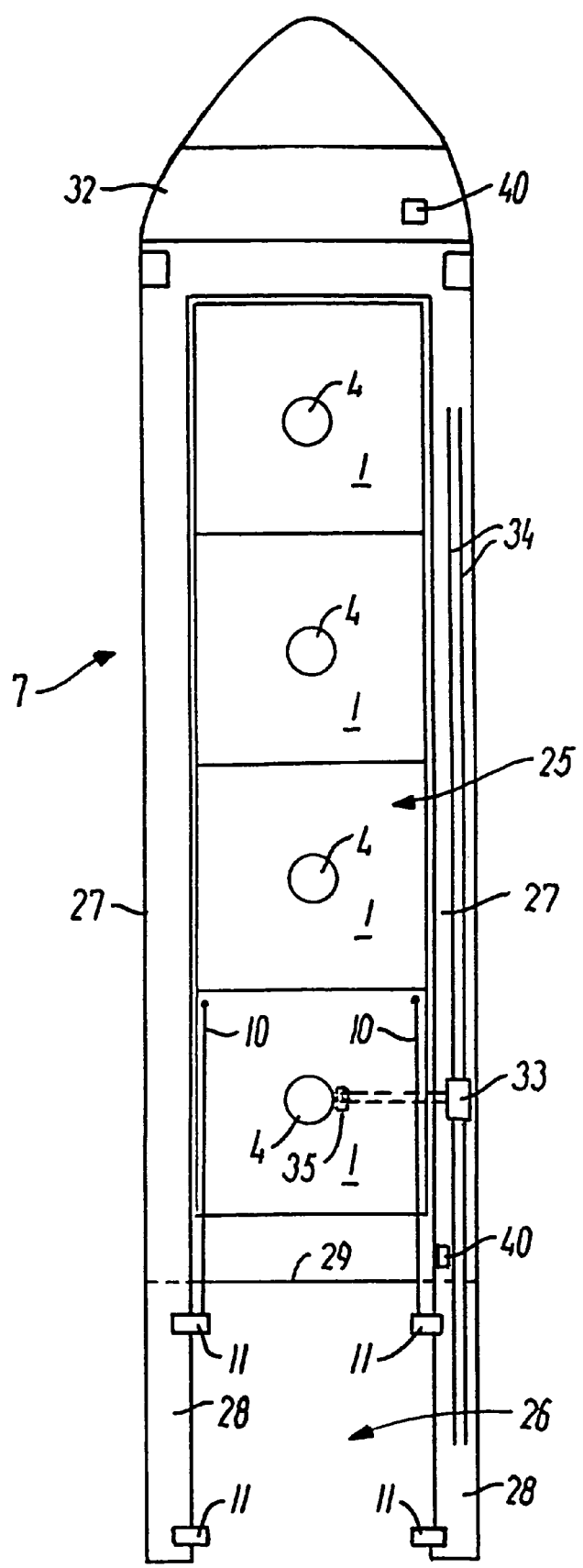
FIG. 12 is a top view outline of a vessel according to the invention, loaded with four wind turbines according to the invention.

The vessel 7 according to the invention is illustrated in a top view in FIG. 12. Four wind turbines 1 have been loaded and placed on the loading space 25 of the vessel. At the aft end of the vessel, an unloading position 26 is formed, from which a wind turbine can be lowered on to the seabed or lifted up therefrom. As illustrated in the drawing, the vessel may be a dock ship having a side superstructure 27 on both sides of the loading deck with a deck part located higher than the loading deck, or it may be a vessel of a barge-like nature not having such continuous higher deck parts in the longitudinal direction. However, the side superstructures 27 provide the advantage that there are upright sides that may serve as sideways guides at stowing and lashing of the wind turbines. Moreover, the side superstructures improve vessel stability in the heavy-draught condition. The vessel may also be a semi-submersible with several hulls.

At the unloading position 26 the vessel 7 has two projecting arms 28, which are extensions of the sides of the vessel aftwards past a sternpost 29 so that there is free access downwards to the seabed between the arms. At the unloading position of the embodiment shown, there are four winches 11, each controlling one of the flexible lines 10, which may, for example, be a wire line or a chain line. Each winch has a drive and at least one winch drum with the wire or the chain for the flexible line running up around a pulley and down to a free end with a fastening member intended for connection to a fastening member at one of the lifting points 23 of the wind turbine base 5.

The fastening member may, for example be a shackle mounted at the end of the wire or the chain of the flexible line. Preferably, the fastening member is of a type with remote release, for example by actuation of a hydraulic cylinder. The release may, for example, be effected by means of a jerk of a releasing line leading from the vessel down to the hydraulic cylinder at the fastening member or by means of a wireless signal transmitted to a receiver on the cylinder. The hydraulic cylinder may, for example, pull back a pawl engaging with the eye fitting at the lifting point. When the pawl has been pulled back, the fastening member is released, and the flexible line 10 may be hoisted. This obviates the use of a diver to release the lines 10 after placing the wind turbine on the seabed.

The vessel 7 has ballast means with a pump system for supply of pressurized liquid, such as seawater. Such a pump system may be a separate system or be part of the usual pump systems of the vessel for supply of flushing water or ballast water for the needs of the vessel.

The ballast means also comprise hoses for connection to the pipes of the base at the connection place 13. Hoses to be used may depart from a fixed place on the vessel and have the adequate length to reach from a wind turbine 1 placed on the loading space nearest the superstructure 32 of the ship to a wind turbine placed at the unloading position 26. Alternatively, a hose set may be provided at the unloading position, and other hose sets at the loading space. In a preferred embodiment, the hose sets of the ballast means are mounted on a hose automat 33 which, as shown in FIG. 12, is displaceable in the longitudinal direction of the vessel on a pair of rails 34 on the side superstructure 27. The hose automat may suitably have a hydraulically operated lift 35 accommodating at least one person. The hoses may be carried by the lift, and when the hoses are not connected to the pipe of a wind turbine, their connecting parts at the hose ends may be placed in a holder on the lift.

When a wind turbine is to be moved from the position of FIG. 2 on the loading space deck to the floating position shown in FIG. 3, the hose sets are first connected to the pipes on the wind turbine, and then ballast is removed from the base. The foremost lines 10 of the vessel have been connected to the foremost mounting places 23 on the lower section 5b of the wind turbine. Then, by operation of the winches 11, the turbine can be displaced horizontally to the unloading position 26 shown in FIG. 13, in which the wind turbine is in a floating position between the arms 28, and simultaneously the hose automat 33 is displaced on the rails 34 to follow the wind turbine.

Then all the flexible lines 10 are connected to the associated lifting points on the lower section 5b of the base. The base is still self-floating with all or most of the upper surface of the lower section 5b located above the sea surface 9. Then the winches 11 are actuated to roll up the flexible lines until each of the lines is subject to a tensile force lifting at the associated lifting point of the base. The wind turbine is thus suspended in the flexible lines while it floats. Naturally, it is also possible to connect all the flexible lines to the lifting points of the base before the wind turbine is moved from the loading space.

In one embodiment, the winches 11 are so-called constant-tension winches persistently keeping up a certain tensile force on the line 10 in the actuated position. This tensile force may suitably be adjustable for each winch. These winches make it possible to supply ballast continuously while increasing the draught of the wind turbine and to keep up predetermined tensile forces at the lifting points.

In another embodiment, each winch 11 is controlled for taking up or paying out depending on whether an increase or a reduction of the tensile force of the line 10 is desired.

It is also possible to generate the lifting force by first taking up the winches 11 in such a way that the slack of the flexible lines 10 is only just taken up, that is, that the lifting force is of a small magnitude when the wind turbine is in its self-floating position. Then the winches 11 can fix the flexible lines, and part of the ballast can be supplied to the ballast tanks 12. In this way, a lift corresponding to the weight of the ballast supplied is built up in each of the flexible lines. When, for example, a third or half the total ballast quantity has been supplied to the base, the wind turbine may be lowered some of the way, whereupon further ballast may be supplied, followed by further lowering and supply of further ballast, etc., until the full ballast quantity has been supplied.

The lift of the individual line corresponds at most to one fourth of the weight of the wind turbine when four lines 10 are used. The lift may suitably correspond to between 5% and 20% of the turbine weight, and preferably between 10% and 15% of the turbine weight.

Figure 14:
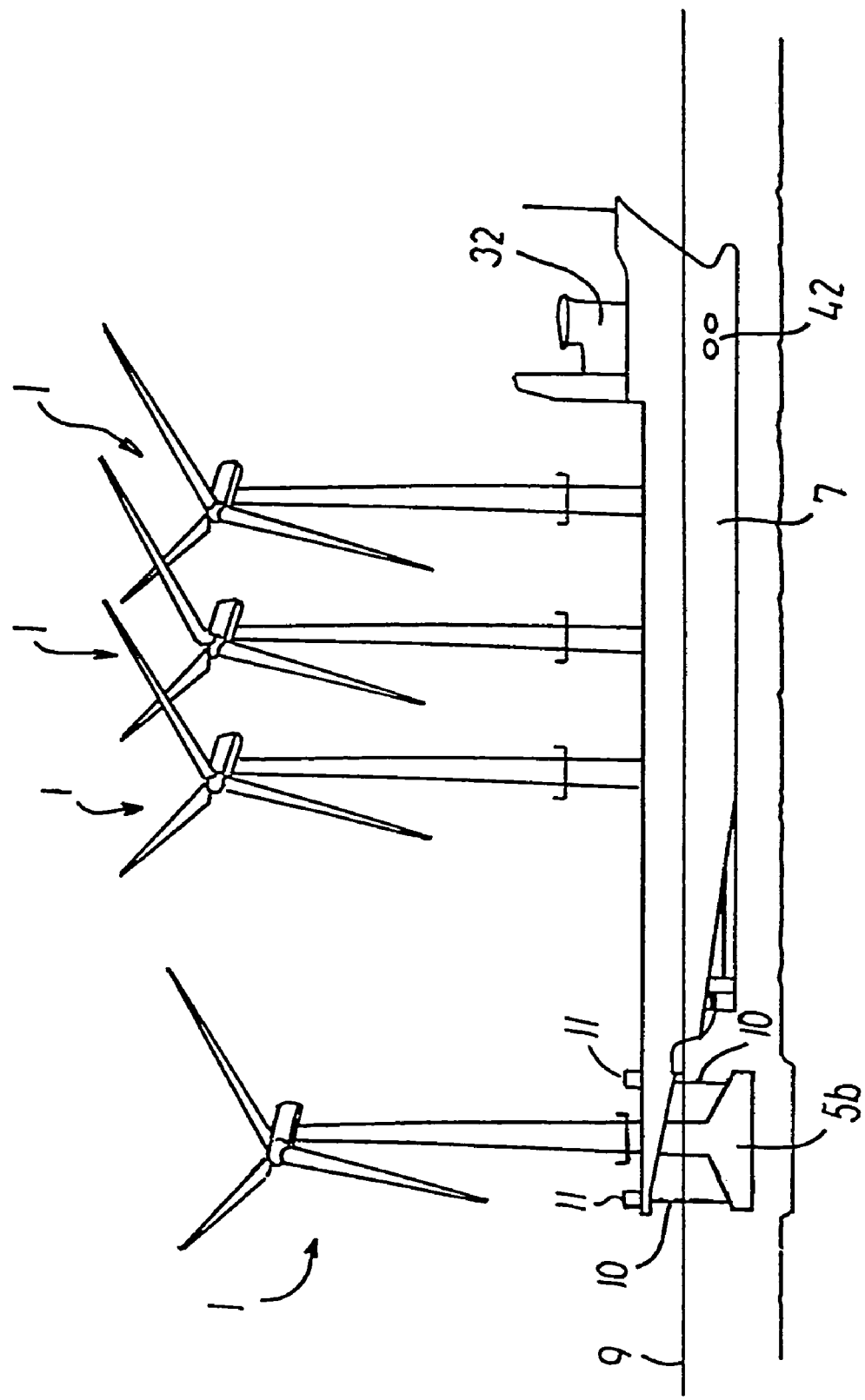
Figure 15:
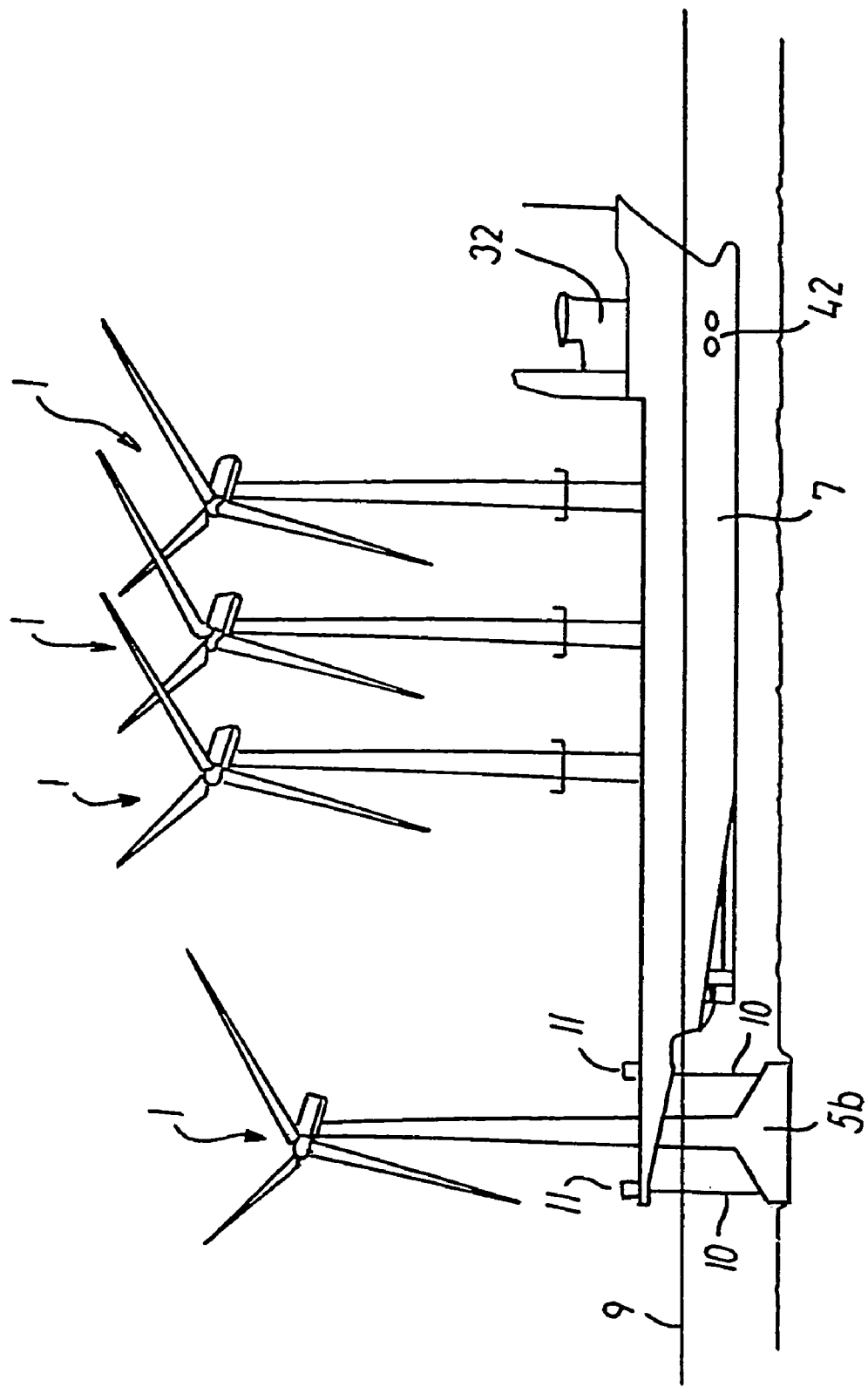
Figure 16:
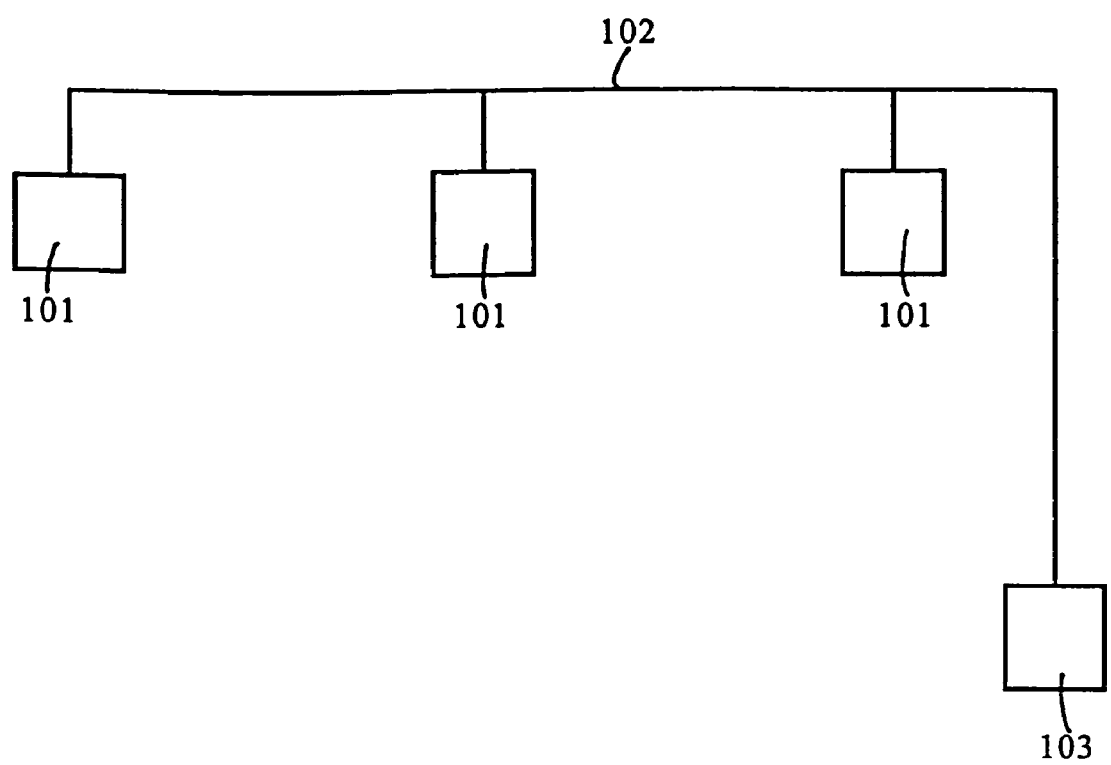
FIG. 16 illustrates a section of a wind farm area with an electric grid and a transformer station.

As a result of the upward forces at the lifting points, the wind turbine is stably suspended by the vessel when the upper surface of the lower section 5a is brought down below the sea surface and during the further lowering as shown in FIG. 14. When the supply of ballast is completed, the winches 11 are paid out so that the wind turbine sinks downwards towards the seabed. When the wind turbine is placed on the seabed as shown in FIG. 5, the lines are released. Then the wind turbine can be connected to the grid, and so-called scour protection be laid out around the lower part of the base to protect it.

Preferably there is one hose set for each ballast tank of the base, and in each set there is a hose for each of the types of pipe leading down to the ballast tanks 12. One set may thus have a filling hose for connection to the filling pipe 14, an emptying hose for connection to the emptying pipe 16 and possibly a sounding hose for connection to the sounding pipe 15. The filling hose may be connected to the pump for supply of pressurized liquid or to the ambient air, and so can the emptying hose. It is also possible that the hose set has only one hose connected to the pump with pressurized liquid and that this hose is then connected to the filling pipe 14 or the emptying pipe 16 depending on whether ballast is to be supplied or removed. The other one of the two pipes may then merely have its cover dismounted so that it is open to the ambient air.

The ballast means and the winches 11 can be controlled from a control station 40. Typically there are two control stations 40, one on the vessel bridge in the superstructure 32 and one located down at the unloading position 26. The control station has control members, such as push buttons, for controlling the winches 11 and the ballast means. When the tanks have sounding pipes, the current sounding height of liquid in the associated tanks can be shown on the control station by means of a pneumatic pressure gauge connected to the sounding hose. If desired, it is also possible to expand the control station with a display of the current tensile forces in the individual lines 10. This may be effected by suspending the pulley, around which the line 10 runs, in a sensor (a weighing cell), which measures a value representing the current axial load on the line 10. Alternatively the winch proper can be equipped for electronic load sensing.

Measurements of the actual axial loads on the lines 10 can be used as a supplement to or instead of sounding pipes. Since it is attempted to obtain uniform lifts in the lines 10, the direct tensile measurement by the sensors can also be used for an automatic alarm signal at the control station when the axial force of one of the lines deviates by more than a predetermined limit value from the axial forces of the other lines. This may, for example, give rise to a change of the ballast quantity in the ballast tank furthest away from the lifting point of the line. The loads measured are thus parameters of a semiautomatic control of the ballast means, as a person actuates the ballast means on the basis of the information.

The measurements of the axial loads on the lines 10 can also be used for automatic control of the ballast means and the winches 11, for example on the basis of a predetermined value for the magnitude of the aggregate lift in the lines 10 and, for example, a predetermined value for the maximum lowering speed.

When it is desired to move the wind turbine from the seabed, the lines 10 are lowered to the lower section 5b of the base, and a diver mounts the fastening means of the lines to the lifting points 23. At the same time, the desired hoses from the ballast means can be mounted on the pipes at the connecting place 13 on the wind turbine. Then the winches 11 are actuated until the desired axial forces in the lines 10 have been established. Then ballast is emptied out from the tanks 12, and if the wind turbine is manufactured with the pipe 31, it is supplied with pressurized liquid at the same time. When the wind turbine has been raised to the self-floating position between the arms 28 shown in FIG. 4, the lines 10 may be slacked, and the wind turbine may be displaced to and placed on the loading space as shown in FIGS. 3 and 2.

Details of the various embodiments can be combined into new embodiments according to the invention, and variations of the said embodiments may be made; the unloading position 68 may for example be formed in the stem of the vessel instead of the stern, or the unloading position may be sideways on the vessel instead of being located at the end of the vessel. In connection with a sideways location, the arms with the winches 11 may be displaceable in the longitudinal direction of the vessel so that one and the same set of arms can be actuated in alignment with each wind turbine. It is also possible to arrange the winches 11 in other ways than as shown, for example with a winch at the end of the arm and two winches mounted on the deck of the vessel.

For use in erecting wind farms located at extensive ocean areas, such as the Atlantic Ocean or the Pacific Ocean, the vessel may be provided with jack-up equipment, for example in the form of four legs with associated drives for vertical displacement of the legs in their longitudinal direction. The legs are mounted on the vessel hull, such as with one leg on each side of the vessel at the front and aft shoulders. Extensive ocean areas often have a persistent swell with a large wavelength, also when the weather is otherwise fine and without any wind. To counter the inconveniences from the swell, the vessel may be stabilized in relation to the seabed by actuation of the jack-up equipment, which can lift the vessel such a limited distance upwards that the swell no longer causes the vessel to move. Naturally, the jack-up equipment can only be actuated during the periods when lowering or raising of a wind turbine is carried out at the unloading position, while the equipment is inactive during the periods when the vessel has a heavy draught for displacement of a wind turbine from or to the loading position.

In view of accurate positioning of a wind turbine in a prepared place of installation on the seabed, the vessel may be equipped with a dynamic positioning system controlling the vessel propellers 41 and bow propellers 42 for maintaining a specific position. The zero point for the vessel determined in the positioning system may then be the centre point between the winches 11 at the unloading position. When the exact intended position of the place of installation of the turbine has been recorded in the system, the vessel is thus controlled so as to maintain the zero point of the vessel vertically above the intended position. As an alternative to such a system, the vessel may be anchored at the correct position.

In a preferred embodiment of the vessel according to the invention the vessel is a semi-submersible barge in which the unloading position is located at the forward end of the hull. The barge can be a traditional tow-barge, but is preferably a push-barge. At the aft end the barge is provided with a coupling system for connecting the barge with a push tug. The coupling system can e.g. be of a type with one or more toothed vertical rods into which the tugboat can enter into engagement. The relative vertical positioning between the tugboat and the barge can vary in the range of 1 to 15 m depending on the loading condition of the barge. The engagement of the tugboat with the vertical rods can be released as desired. This is an advantage when the barge changes its deadweight because a wind turbine is loaded or unloaded. At the forward end the barge is provided with two protruding arms at the unloading position. At the aft end the barge is equipped with one jack-up leg at either side of the barge. It is an advantage to lock the position of the barge in relation to the seabed before the wind turbine is to be lowered into place on the seabed. When the two jack-up legs have been lowered to be in contact with the seabed the position of the barge is locked in relation to the precise installation site of the wind turbine and there is not any real need for a dynamic positioning system in order to guide the wind turbine into a precise positioning. The barge can have one or more bow thrusters in the aft end. Preferably the bow thrusters are azimuth thrusters of a power of e.g. 1000 kW. The barge can e.g. have a loading space of a width of slightly over 30 m so that one or more wind turbines with a base having a width of up to 30 m can be placed on the loading space. It is of course also possible to locate the unloading position in the aft end of the barge.

The vessel can be utilized for sailing wind turbines from a port area to the offshore wind farm as described in detail in the above. In this case the vessel is sailing or, in case the vessel is a barge is pushed or towed, between the port area and the wind farm in order to pick up new wind turbines for placement on the farm. The vessel or barge can also be positioned for extended periods on the wind farm and be utilized to lower wind turbines down to the seabed from a self-floating state. In the latter case the wind turbines can be towed from the port area or manufacturing area out to the wind farm. At the wind farm each wind turbine is floated into the unloading position at the vessel, the lines from the vessel are connected to the lifting points on the wind turbine base, and ballast is supplied to the wind turbine base while the wind turbine base is held suspended in the horizontally distanced flexible lines from the vessel with at least most of the upper surface of the wind turbine base located above the sea surface, whereupon the wind turbine is lowered down into position on the seabed by paying out the flexible lines from the winches on the vessel.

The installation of the wind farm can be initiated by preparing the seabed in the areas 101 where wind turbines are to be located. The seabed is levelled and possibly compressed to such firmness that it can support the wind turbine. Then the electric grid 102 is installed on the sea bottom, and a wind turbine base carrying a transformer station 103 on top of the upper part 5b is placed on the farm, and the transformer station is connected to the electric grid 102. Then wind turbines are installed, and as the wind turbines are placed on the farm they are connected to the electric grid and begin to produce electricity.

The invention claimed is:

1. A combination of a vessel and at least a wind turbine base transportable by the vessel, wherein the vessel has a loading space sized for receiving said wind turbine base, which wind turbine base is in an upright position corresponding to an upright operating position of said wind turbine base during placement on said loading space, said vessel having means for displacing said wind turbine base from the loading space to an unloading position, said vessel having winches with at least three flexible lines with associated fastening means arranged for mounting on at least three lifting points on said wind turbine base, which flexible lines are arranged at the unloading position so that their sections, when extending down to said lifting points on said wind turbine base at said unloading position, are spaced apart in the horizontal direction, and wherein a ballast condition of the wind turbine base is variable for adjustment at said unloading position.

2. A vessel according to claim 1, wherein said wind turbine base has a width, and said vessel has at the unloading position two projecting arms arranged at a mutual horizontal distance larger than the width of the wind turbine base, and that at least two of the flexible lines extend from the arms to the lifting points on the wind turbine base.

3. A vessel according to claim 2, wherein each arm is associated with at least two flexible lines extending from the arm down to the lifting points on the wind turbine base.

4. A vessel according to claim 3, wherein said two flexible lines extend down to the lifting points with a mutual distance in a longitudinal direction of the arm substantially corresponding to the length of the wind turbine base.

5. A vessel according to claim 1, wherein the means for displacing the wind turbine base comprise rails extending along a full length of the loading space of the vessel to the unloading position.

6. A vessel according to claims 1, wherein at least one of the winches with flexible lines used at the unloading position is part of the means for displacement of the wind turbine base from the loading space to the unloading position.

7. A vessel according to claim 1, wherein the vessel, in a condition of heavy draught, has a deck of the loading space located at such depth below the water surface that the wind turbine base can float over the loading space and, in a transport condition with lighter draught, has the deck of the loading space located above the water surface, whereby the wind turbine based is carried by the vessel.

8. A vessel according to claim 1, wherein the vessel has ballast means for changing the ballast condition of the wind turbine base.

9. A vessel according to claim 8, wherein the turbine base has a number of ballast tanks, and the ballast means have a number of hose sets corresponding to the number of ballast tanks in the turbine base.

10. A vessel according to claim 9, wherein the ballast means have at least four hose sets.

11. A vessel according to claim 9, wherein each hose set comprises a filling hose that can be connected to a liquid source and can preferably also be switched to an air source, and an emptying hose that can be supplied with pressurized liquid.

12. A vessel according to claim 11, wherein each hose set has a sounding hose connected to a pneumatic pressure gauge.

13. A vessel according to claim 8, wherein control of liquid and/or air supply to the hoses is remotely controlled from a control station having at least one control member, such as least one control member for each hose set, for adjustment of ballast changes in the wind turbine base.

14. A vessel according to claim 1, wherein each of the flexible lines extends over an associated pulley suspended in a sensor for determination of the axial load in the line.

15. A vessel according to claim 14, wherein the axial loads measured in the lines are included as parameters in a control of ballast means for changing the ballast condition of the wind turbine base.

16. A vessel according to claim 1, wherein the flexible lines are controlled to have axial loads of the lines of substantially the same magnitude.

17. The vessel of claim 1, wherein said wind turbine base includes a tower, nacelle and rotor blades attached thereto.

18. A combination of a vessel and at least a wind turbine base transportable by the vessel, wherein the vessel has a loading space sized for receiving said at least one wind turbine, said wind turbine base being in an upright position corresponding to an upright operating position of said wind turbine base when placed on said loading space, said vessel having means for displacing said wind turbine base from the loading space to an unloading position, said vessel having winches with at least three flexible lines with associated fastening means arranged for mounting on at least three lifting points on the wind turbine base, the flexible lines being arranged at the unloading position so that their sections extending down to mounting places on the wind turbine base are spaced apart in the horizontal direction, and a ballast condition of the wind turbine base is variable for adjustment at said unloading position, and wherein the vessel has ballast means for changing the ballast condition of the wind turbine base, which ballast means comprise a pump system for liquid with a plurality of hoses configured for connection on the wind turbine base.

19. A vessel according to claim 18, wherein a hose automat with the hoses is displaceable in a longitudinal direction of the vessel.

20. A vessel of claim 18, wherein said wind turbine base includes a tower, nacelle and rotor blades attached thereto.

21. A combination of a vessel and at least a wind turbine base transportable by the vessel, wherein the vessel has a loading space sized for receiving said wind turbine base, said wind turbine base being in an upright position corresponding to an upright operating position of the wind turbine base when placed on said loading space, said vessel having means for displacing the wind turbine base from the loading space to an unloading position, said vessel having winches with at least three flexible lines with associated fastening means arranged for mounting on at least three lifting points on the wind turbine base, the flexible lines being arranged at the unloading position so that their sections extending down to mounting places on the wind turbine base are spaced apart in the horizontal direction, and said wind turbine base which is divided into at least three chambers at least three of which act as ballast tanks, and wherein the vessel has ballast means for changing the ballast condition of said wind turbine base at said unloading position.

22. A vessel according to claim 21, wherein said ballast means supply ballast to said at least three chambers acting as ballast tanks while the wind turbine base is held suspended in said at least three flexible lines from the vessel with at least most of the upper surface of the wind turbine base located above the sea surface.

23. A vessel according to claim 21, wherein said wind turbine base has a square shape at its lower part and a lifting fitting at each corner.

24. A vessel according to claim 21, wherein each of said chambers acting as a ballast tank has a filling pipe and an emptying pipe, the emptying pipe extending down near the bottom of the ballast tank.

25. A vessel according to claim 24, wherein each of said chambers acting as a ballast tank has a sounding pipe extending down near the bottom of the ballast tank.

26. A vessel according to claim 24, wherein said emptying pipe is provided with an ejector for suction of fluid from the ballast tank when the ejector is supplied with pressurized liquid.

27. A vessel of claim 21, wherein said wind turbine base includes a tower, nacelle and rotor blades attached thereto.

* * * * *